(12) United States Patent
Gabbey et al.

(10) Patent No.: US 6,338,362 B1
(45) Date of Patent: Jan. 15, 2002

(54) VENT VALVE ASSEMBLY

(75) Inventors: David John Gabbey, Pinckney; Daniel Paul Cunkle, Jonesville, both of MI (US)

(73) Assignee: Pilot Industries, Inc., Dexter, MI (US)

( * ) Notice: Subject to any disclaimer, the term of this patent is extended or adjusted under 35 U.S.C. 154(b) by 0 days.

(21) Appl. No.: 09/707,465

(22) Filed: Nov. 7, 2000

(51) Int. Cl.[7] ............................................. F16K 24/00
(52) U.S. Cl. ........................ 137/588; 137/587; 137/592
(58) Field of Search ................................ 137/587, 588, 137/592

(56) References Cited

U.S. PATENT DOCUMENTS 4,966,299 A * 10/1990 Teets et al. ................. 220/746
5,282,497 A * 2/1994 Allison ........................ 137/588
6,105,612 A * 8/2000 Schaar ........................ 137/588

* cited by examiner

*Primary Examiner*—A. Michael Chambers
(74) *Attorney, Agent, or Firm*—Gifford, Krass, Groh, Sprinkle, Anderson & Citkowski, P.C.

(57) ABSTRACT

A positive sealing inlet (PSI) valve assembly is provided for an automotive fuel tank fill tube. The PSI valve assembly includes a tubular housing having an interior and an exterior and this housing is fluidly mounted in series with the fuel tank fill tube. The housing includes a wall extending across the interior of the housing adjacent one end and this wall includes a through opening. A flapper valve is movable between an open and a closed position. In its closed position, the flapper valve overlies and closes the wall opening. Conversely, in its open position, the flapper valve is positioned away from the wall opening to permit nozzle insertion through the wall opening. The PSI valve is pivotally connected to a valve holder and this valve holder is mounted entirely within the interior of the housing. A spring is operatively disposed between the valve holder and flapper valve and urges the vent valve towards its closed position.

10 Claims, 4 Drawing Sheets

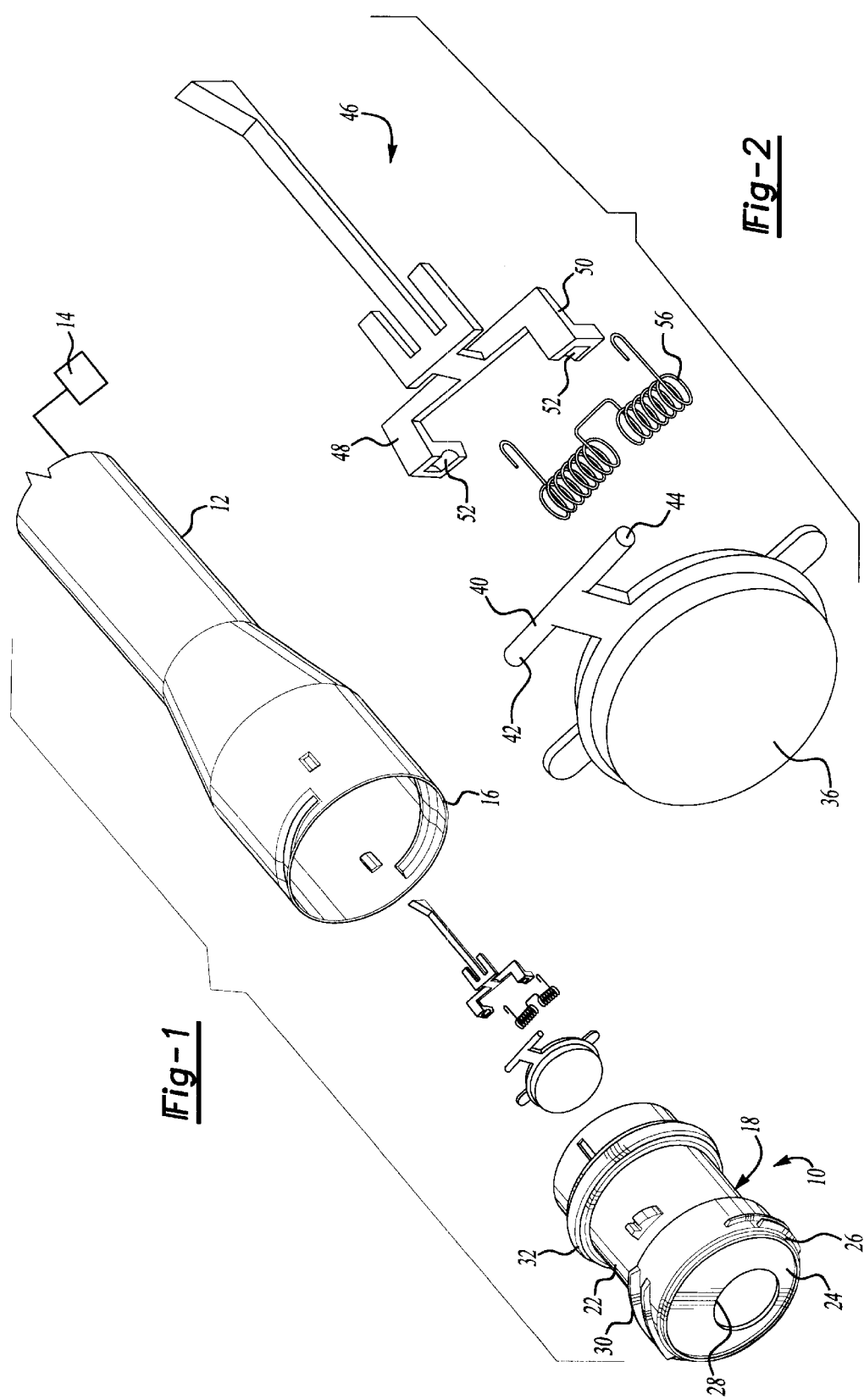

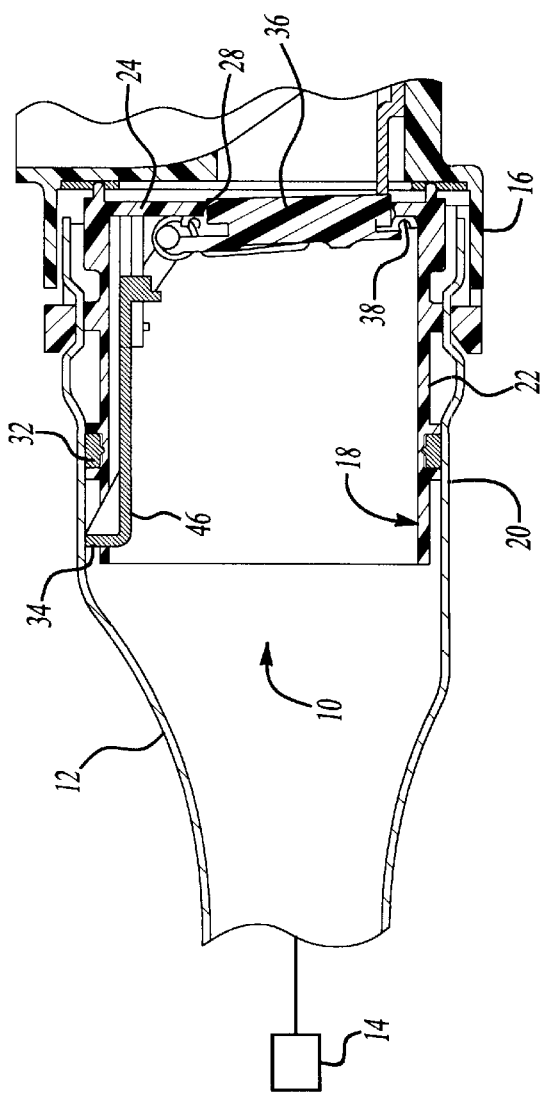
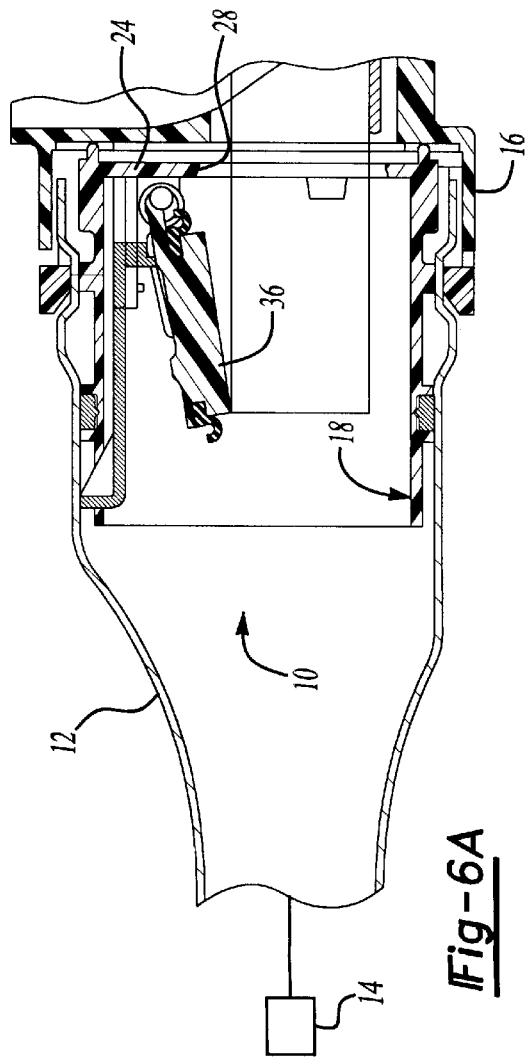

VENT VALVE ASSEMBLY

BACKGROUND OF THE INVENTION

I. Field of the Invention

The present invention relates to a positive sealing inlet (PSI) valve assembly for the fill tube on the fuel tank of an automotive vehicle.

II. Description of the Prior Art

In previously known automotive vehicles, a fill tube is provided between the exterior of the automotive vehicle and the fuel tank. While in many previously known automotive vehicles, the fill tube is merely covered by a removable fill cap, in other types of previously known automotive vehicles, a PSI valve is provided across the fill tube. This PSI valve is designed to minimize the escape of fuel vapors from the fuel tank through the fill tube.

These previously known PSI valves, however, have been rather rudimentary in design. As such, these previously known PSI valves reduce, but do not eliminate, the escape of fuel vapors from the fuel tank through the fill tube. However, in view of ever increasing governmental regulations regarding the emissions of fuel vapors into the atmosphere, these previously known PSI valves have proven inadequate to meet government standards.

One reason that these previously known PSI valves have been unable to meet government standards is that the PSI valve is secured to the fill tube by fasteners extending through the fill tube. These fasteners, however, create openings in the fill tube which can permit the escape of fuel vapors through these fastener openings, particularly after extended use of the automotive vehicle.

A still further disadvantage of these previously known PSI valves is that the attachment of the PSI valve to the fill tube was labor intensive and oftentimes required special tools. As such, these additional labor costs increased the overall cost of the PSI valve assembly.

SUMMARY OF THE PRESENT INVENTION

The present invention provides a PSI valve assembly for the fill tube of an automotive vehicle which overcomes all of the above-mentioned disadvantages of the previously known devices.

In brief, the PSI valve assembly of the present invention comprises a tubular and cylindrical housing having both an interior and exterior surface. A wall is disposed across the interior of the housing adjacent one end of the housing and this wall includes a through opening. Preferably, the housing and the wall are of a one-piece plastic construction.

A flapper valve is pivotally secured to a valve holder so that the flapper valve is movable between an open and a closed position. In its closed position, the flapper valve overlies and fluidly seals the through opening in the housing wall. Conversely, with the flapper valve in its open position, the flapper valve is spaced away from the wall through opening thus permitting fuel to flow through the housing and to the fuel tank.

Unlike the previously known devices, however, the flapper valve as well as the valve holder is positioned within the interior of the housing. A fluid seal is disposed around the exterior surface of the housing and this fluid seal sealingly engages the interior of the fill tube. Furthermore, the exterior surface of the housing is continuous, i.e. has no openings, between the fluid seal and the housing end at which the flapper valve is mounted.

Since the entire exterior of the housing is continuous between the fluid seal between the housing and the fill tube and the end of the housing at which the flapper valve is mounted, the escape of fuel vapors from the fuel tank around the exterior of the housing is substantially precluded. Furthermore, in order to enhance the fluid seal between the flapper valve and the housing wall, a fluid seal is preferably disposed around the outer periphery of the PSI valve and this fluid seal engages the housing wall when the flapper valve is rotated to its assembled position.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1 is an exploded perspective view illustrating a preferred embodiment of the present invention;

FIG. 2 is an exploded view illustrating the PSI valve and its holder;

FIG. 6 is a longitudinal sectional view taken substantially along line 6—6 in FIG. 4; and FIG. 6A is a view similar to FIG. 6, but illustrating the flapper valve in an open position.

DETAILED DESCRIPTION OF A PREFERRED EMBODIMENT OF THE PRESENT INVENTION

Figure 3:
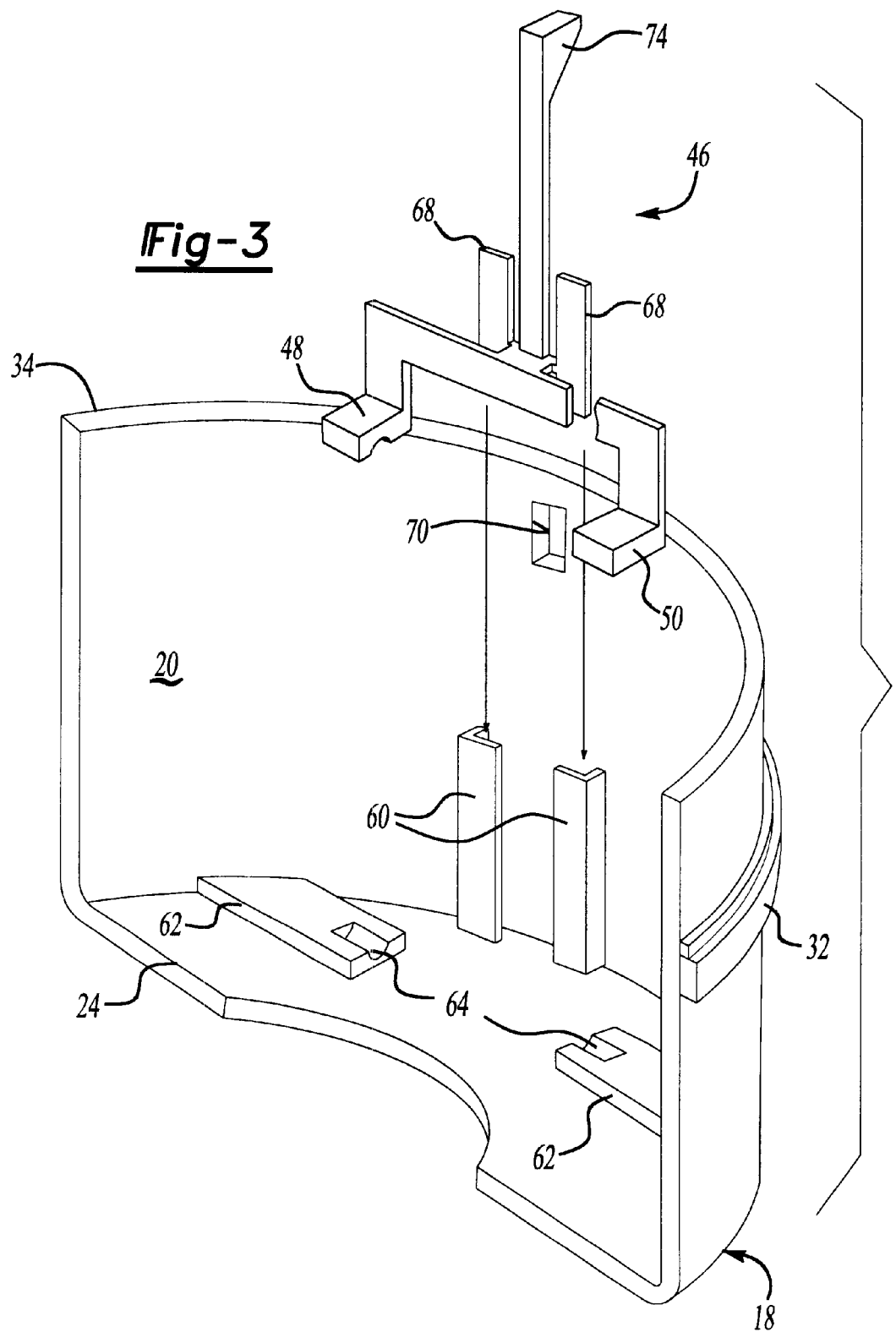
FIG. 3 is an exploded view illustrating the assembly of the PSI valve holder into the housing.
Figure 4:
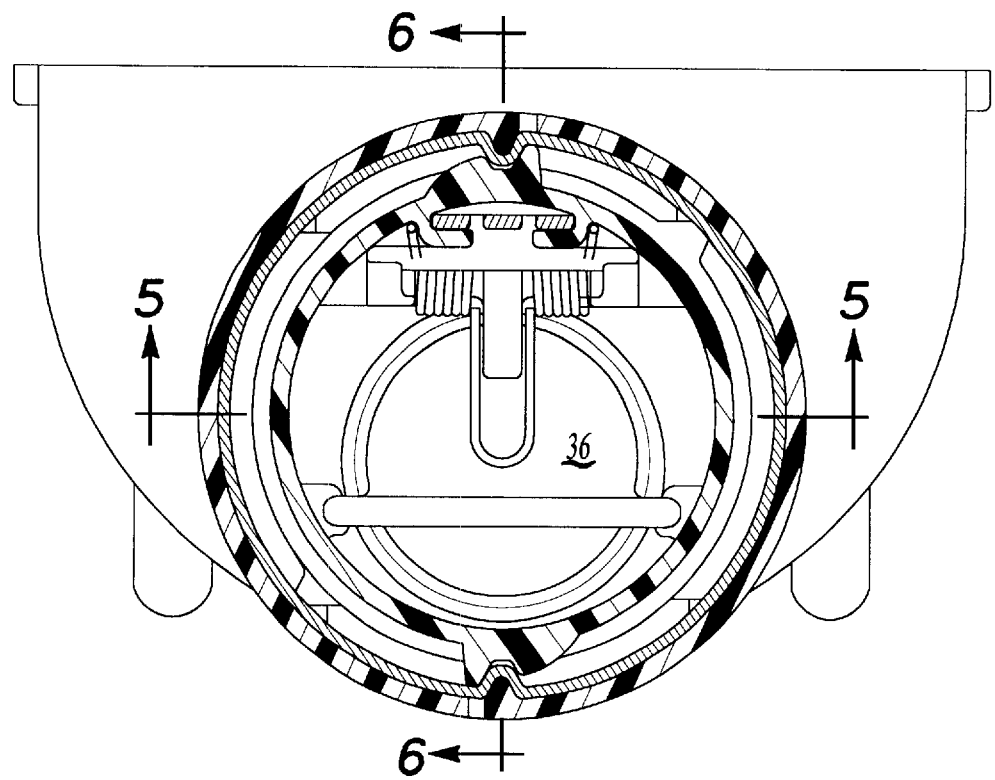
FIG. 4 is a cross-sectional view illustrating the preferred embodiment of the present invention.
Figure 5:
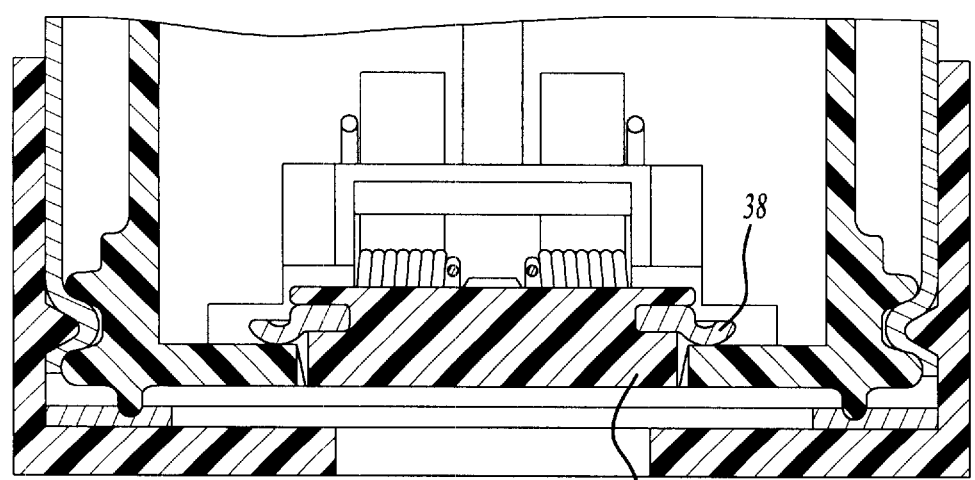
FIG. 5 is a sectional view taken substantially along line 5—5 in FIG. 4.

With reference first to FIGS. 1, 6 and 6A, a preferred embodiment of the PSI valve assembly 10 of the present invention is there shown for use with an automotive vehicle having a fuel fill tube 12 open at one end to a fuel tank 14 (illustrated diagrammatically). The fill tube 12 is generally tubular and cylindrical in shape and is open at its end 16 opposite from the fuel tank 14.

The PSI valve assembly 10 comprises a tubular and cylindrical housing 18 having both an interior 20 and an exterior 22. A wall 24 extends across the interior 20 of the housing 18 adjacent one end 26 of the housing 18. A circular through opening 28 is provided through the housing wall 24. Additionally, preferably the housing 18 as well as the wall 24 are of a one-piece plastic construction.

With reference now particularly to FIG. 6, the housing 18 is coaxially mounted within the interior of the fill tube 12 such that the housing 18 is mounted fluidly in series with the fill tube 12. Additionally, with the housing 18 mounted within the fill tube 12, the wall 24 is closely adjacent the open end 16 of the fill tube 12.

Any conventional means, such as a threaded connection 30 (FIG. 1), can be utilized to secure the housing 18 to the fill tube 12. Additionally, a resilient fluid seal 32 is disposed annularly around the exterior surface 22 of the housing 18 adjacent the end 34 of the housing opposite from its end 26. This fluid seal 32 sealingly engages the interior of the fill tube 12 when the housing 18 is mounted within the fill tube 12 as best shown in FIG. 6.

With reference now to FIGS. 4, 5, 6 and 6A, a flapper valve 36 is mounted within the interior 20 of the housing 18. This flapper valve 36 is movable between a closed position, illustrated in FIG. 6, and an open position, illustrated in FIG. 6A. In its closed position, the flapper valve 36 overlies and covers the through opening 28 formed in the housing wall 24. In its closed position, the flapper valve 36 seals the housing wall 24 and prevents the escape of fuel vapors from the fuel tank 14 out through the fill tube 12. A fluid seal 38 mounted around the outer periphery of the flapper valve 36 enhances the sealing action of the flapper valve 36 against the wall 24 when the flapper valve 36 is in its closed position. Conversely, when the flapper valve is moved to its open position, illustrated in FIG. 6A, the flapper valve 36 pivots away from the housing opening 28 thus permitting fuel to flow through the housing 18 and into the fuel tank 14.

With reference now to FIGS. 2 and 3, in order to mount the flapper valve 36 within the interior 20 of the housing 18, a pivot rod 40 (FIG. 2) forms a part of the flapper valve 36 and extends outwardly from one side of the flapper valve 36. The rod 40, furthermore, includes two free cylindrical ends 42 and 44.

The PSI valve mounting means further includes a valve holder 46 having two spaced apart sections 48 and 50, each having a semi-cylindrical recess 52 such that the recesses 52 engage the opposite ends 42 and 44 of the valve rod 40. In doing so, the flapper valve 36 is pivotal relative to the valve holder 46 between its closed position (FIG. 6) and its open position (FIG. 6A). A helical spring 56 is operatively disposed between the valve holder 46 and flapper valve 36 to resiliently urge the flapper valve 36 towards its closed position.

With reference now particularly to FIG. 6, a pair of facing channel members 60 are provided on the interior 20 of the housing 18 so that the channels 60 extend generally longitudinally along the housing 18. These channels 60 are preferably of a one-piece construction with the housing 18.

Still referring to FIG. 3, a pair of spaced apart bearing mounts 62 are integrally formed with the housing 24. These bearing mounts 62 each contain a semi-cylindrical recess 64 adapted to receive the opposite ends 42 and 44 (FIG. 2) of the valve rod 40.

Referring again to FIG. 3, the valve holder 46 includes a pair of slides 68 which are adapted to be slidably received within the channel 60. These slides 68, furthermore, are slidably received within the channel 60 as the valve holder 46 is slid into the housing 18 until its spaced sections 48 and 50 abut against the bearing mounts 62 thus entrapping the ends 42 and 44 of the valve rod 40 between the valve holder 46 and the bearing mounts 62.

A radially extending opening 70 is formed through the housing 18 between the fluid seal 32 and the inner end 34 of the housing 18. When the valve holder 46 is moved to its operative position, a catch 74 on the valve holder 46 protrudes outwardly through the opening 70 thus locking the valve holder 46, and simultaneously pivotally securing the flapper valve 36 to the housing 18, against further movement.

As can be seen from the foregoing, the flapper valve 36 as well as the vent valve holder is contained entirely within the interior of the housing 18 except for the catch 74 which extends through the housing opening 70. However, the primary advantage of the PSI valve assembly 10 of the present invention is that the entire exterior 22 of the housing 18 is continuous, i.e. it has no openings between the fluid seal 32 and the outer end 26 of the housing 18. Consequently, the escape of fuel vapors either around the outer periphery of the housing 18 or through openings formed through the housing 18 (other than the wall opening 28) is effectively precluded. Since the fluid seal 38 on the flapper valve 36 effectively seals the flapper valve 36 to the housing wall 24, the escape of fuel vapors through the wall opening 28 is also effectively precluded.

A still further advantage of the present invention is that the entire PSI valve assembly 10 may be easily manually mounted to the valve housing 18 without the need for any special tools.

Having described my invention, however, many modifications thereto will become apparent to those skilled in the art to which it pertains without deviation from the spirit of the invention as defined by the scope of the appended claims.

What is claimed is:

1. A PSI valve assembly for a fuel tank fill tube comprising:

a tubular housing having an interior and an exterior, said housing being positioned in series with the fuel tank fill tube, said housing having a wall extending across said housing adjacent one end of said housing, said wall having a through opening, a flapper valve movable between a closed position in which said flapper valve overlies and closes said wall opening, and an open position in which said flapper valve is positioned away from said wall opening to permit fuel flow through said wall opening, means for resiliently urging said flapper valve toward said closed position, and means contained entirely within an interior of said housing for mounting said flapper valve to said housing, wherein said PSI valve mounting means comprises at least one channel formed on said interior of said housing, a valve holder, said flapper valve being pivotally mounted to said valve holder between said open and said closed position, said valve holder being slidably received in said housing channel, and means for securing said valve holder to said housing at a predetermined position relative to said housing.

2. The invention as defined in claim 1 wherein said housing is tubular and cylindrical in shape.

3. The invention as defined in claim 2 wherein said housing and said wall are of a one piece construction.

4. The invention as defined in claim 1 and comprising means for fluidly sealing said housing to an interior of the fill tube.

5. The invention as defined in claim 4 wherein said exterior of said housing is continuous between said one end of said housing and said fluid sealing means.

6. The invention as defined in claim 1 wherein said resilient urging means comprises a spring operatively connected between said valve holder and said flapper valve.

7. The invention as defined in claim 1 wherein said housing includes an aperture formed through said housing adjacent its other end and wherein said means for securing said valve holder to said housing comprises a latch on said valve holder, said latch extending through said aperture when said valve holder is in said predetermined position.

8. The invention as defined in claim 7 and comprising a fluid seal disposed around said exterior of said housing, said fluid seal being positioned between said aperture and said one end of said housing.

9. The invention as defined in claim 1 and comprising a fluid seal mounted around an outer periphery of said flapper valve, said fluid seal engaging said housing wall when said flapper valve is in said closed position.

10. The invention as defined in claim 1 wherein said housing is made of plastic.

* * * * *